US008665745B2

(12) United States Patent  
Lundin et al.

(10) Patent No.: US 8,665,745 B2  
(45) Date of Patent: Mar. 4, 2014

(54) METHOD AND DEVICE FOR DETERMINING A JITTER BUFFER LEVEL

(75) Inventors: Henrik Fahlberg Lundin, Sollentuna (SE); Stefan Holmer, Stockholm (SE)

(73) Assignee: Google Inc., Mountain View, CA (US)

( * ) Notice: Subject to any disclaimer, the term of this patent is extended or adjusted under 35 U.S.C. 154(b) by 122 days.

(21) Appl. No.: 13/497,625

(22) PCT Filed: Sep. 20, 2010

(86) PCT No.: PCT/EP2010/063818  
§ 371 (c)(1),  
(2), (4) Date: Mar. 22, 2012

(87) PCT Pub. No.: WO2011/036123  
PCT Pub. Date: Mar. 31, 2011

(65) Prior Publication Data  
US 2012/0281572 A1    Nov. 8, 2012

Related U.S. Application Data

(60) Provisional application No. 61/245,003, filed on Sep. 23, 2009.

(30) Foreign Application Priority Data

Sep. 23, 2009 (EP) .................... 09171120

(51) Int. Cl.  
*H04L 12/26* (2006.01)  
*H04L 12/28* (2006.01)

(52) U.S. Cl.  
USPC ....................... 370/252; 370/412

(58) Field of Classification Search  
USPC ............... 370/252, 412–418, 428, 429  
See application file for complete search history.

(56) References Cited

U.S. PATENT DOCUMENTS

| 6,452,950 | B1 | 9/2002 | Ohlsson et al. |
| 6,665,317 | B1 | 12/2003 | Scott |
| 6,683,889 | B1 | 1/2004 | Shaffer et al. |
| 6,747,999 | B1 | 6/2004 | Grosberg et al. |
| 6,792,047 | B1 | 9/2004 | Bixby et al. |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Hong Cho  
(74) *Attorney, Agent, or Firm* — Young Basile Hanlon & MacFarlane P.C.

(57) ABSTRACT

It is disclosed a method for determining a buffer level of a jitter data buffer (203) comprised in a receiver (200) adapted to sequentially receive data packets from a communications network (202), wherein frames are encoded into the data packets. Each frame may comprise timestamp information and payload size information. The buffer level is determined on the basis of a first part of frame arrival delay related to payload size variation between frames and a second part related to the amount of crosstraffic in the communications network (202). It is further disclosed a receiver (200) adapted to sequentially receive data packets from a communications network (202), wherein frames are encoded into the data packets, the receiver (200) comprising a data jitter buffer (203) and being adapted to perform the method.

15 Claims, 4 Drawing Sheets

(56) References Cited

U.S. PATENT DOCUMENTS

| | | |
|---|---|---|
| 6,859,460 B1 | 2/2005 | Chen |
| 6,996,059 B1 * | 2/2006 | Tonogai ......................... 370/230 |
| 7,096,481 B1 | 8/2006 | Forecast et al. |
| 7,359,324 B1 * | 4/2008 | Ouellette et al. .............. 370/230 |
| 7,733,893 B2 * | 6/2010 | Lundin .......................... 370/412 |
| 2002/0167911 A1 * | 11/2002 | Hickey .......................... 370/252 |
| 2005/0063402 A1 * | 3/2005 | Rosengard et al. ........... 370/412 |
| 2007/0189164 A1 | 8/2007 | Smith et al. |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

Page, E. S., "Continuous Inspection Schemes"; Biometrika 41; Statistical Laboratory, University of Cambridge, (1954); pp. 100-115.

Extended European Search Report EP09171120, dated Aug. 2, 2010.

* cited by examiner

METHOD AND DEVICE FOR DETERMINING A JITTER BUFFER LEVEL

CROSS-REFERENCE TO RELATED APPLICATIONS

This application is a National Stage of International Application PCT/EP2010/063818, filed Sep. 20, 2010, and claims priority to European Patent Application No. 09171120.0, filed Sep. 23, 2009, and U.S. Provisional Patent Application 61/245,003, filed Sep. 23, 2009, all of which are hereby incorporated by reference in their entireties.

TECHNICAL FIELD

The present invention generally relates to electrical telecommunication and more particularly to packet networks using the Internet protocol (IP). In particular, the present invention relates to data packet delivery in such networks.

BACKGROUND

In a video-over-IP system, each image, or frame, may be encoded into one or several data packets that are sent with minimal delay ("back-to-back") to the IP network. The frames are usually produced at a constant frame rate, wherefore the packet clusters are sent at the same constant rate. On the receiver side the packets arrive with a variable delay. This delay is mainly due to the delays inflicted by the IP network and is often referred to as jitter. The severity of the jitter can vary significantly depending on network type and current network conditions. For example, the variance of the packet delay can change with several orders of magnitude from one network type to another, or even from one time to another on the same network path.

In order to reproduce a video stream that is true to the original that was transmitted from the source(s), the decoder (or receiver) must be provided with data packet clusters at the same constant rate with which the data packet clusters were sent. A device often referred to as a jitter buffer may be introduced in the receiver. The jitter buffer may be capable of de-jittering the incoming stream of packets and providing a constant flow of data to the decoder. This is done by holding the packets in a buffer, thus introducing delay, so that also the packets that were subject to larger delays will have arrived before their respective time-of-use.

There is an inevitable trade-off in jitter-buffers between buffer delay on the one hand and distortions due to late arrivals on the other hand. A lower buffer level, and thus a shorter delay, generally results in a larger portion of packets arriving late or even being discarded, as the packets may be considered as being too late, while a higher buffer level, and thus a longer delay, is generally detrimental in itself for two-way communication between, e.g., humans.

SUMMARY

It is with respect to the above considerations and others that the present invention has been made. In particular, the inventors have realized that it would be desirable to achieve a method for determining a buffer level of a jitter data buffer comprised in a receiver adapted to sequentially receive data packets from a communications network, wherein frames are encoded into the data packets, which method is capable of determining the appropriate buffer level in various network conditions. Furthermore, the inventors have realized that it would be desirable to determine the buffer level of a jitter data buffer on the basis of a first part of frame arrival delay related to payload size variation between frames and a second part related to the amount of crosstraffic in the communications network.

To better address one or more of these concerns, a method and a receiver having the features defined in the independent claims are provided. Further advantageous embodiments of the present invention are defined in the dependent claims.

According to a first aspect of the present invention, there is provided a method for determining a buffer level of a jitter data buffer comprised in a receiver adapted to sequentially receive data packets from a communications network, wherein frames are encoded into the data packets, each frame comprising timestamp information T and payload size information L. The buffer level is determined on the basis of a first part of frame arrival delay related to payload size variation between frames and a second part related to the amount of crosstraffic in the communications network. The method may comprise, for each frame, determining a frame pay-load size difference $\Delta L$ by comparing L of the current frame with L of a previous frame, determining a frame inter-arrival time $\Delta t$ by comparing the measured arrival time of the current frame with the measured arrival time of a previous frame, determining a temporal frame spacing $\Delta T$ by comparing T of the current frame with T of a previous frame, and/or determining a frame network transit delay d on the basis of the difference between $\Delta t$ and $\Delta T$. The method may comprise, for each frame, estimating a set of parameters of a linear relationship between $\Delta L$ and d on the basis of $\Delta L$ and d for the current frame and $\Delta L$ and d determined for at least one previous frame. A first parameter and a second parameter comprised in the set may be adapted to be indicative of the first and second part, respectively. The method may comprise, for each frame, estimating a maximum frame payload size and an average frame payload size on the basis of L of the current frame and L of at least one previous frame. For each frame, the buffer level may be determined on the basis of the maximum frame payload size, the average frame payload size and the parameters of the linear relationship.

Such a configuration enables the determination of an appropriate buffer level of the jitter buffer in various network conditions, by determining the buffer level on the basis of statistical measures of current network conditions. In this manner, both frame arrival delay related to payload size variation between frames ('self-inflicted' frame arrival delay) and a frame arrival delay related to the amount of crosstraffic in the communications network may be taken into account in the determination of the buffer level. This is generally not the case in known devices and methods.

By the separation of the packet delay contributions into self-inflicted and cross-traffic delays, an improved adaptability to varying network conditions may be obtained. For instance, consider a typical situation where a majority of the frames are roughly equal in size (i.e. having a roughly equal payload size), while few frames are relatively large (e.g. in comparison with the majority of flames). Conventionally, only the frame inter-arrival time is considered in the procedure of setting the buffer level. In such a case, only the few packets that result in the largest inter-arrival time would provide any useful information for the procedure of setting the buffer level. In contrast, according to embodiments of the present invention, all of the frames encoded in the arriving packets in general contributes with information that may be utilized for estimating the set of parameters of a linear relationship between $\Delta L$ and d. In this manner, an improved accuracy and an increased adaptability with regards to varying network conditions may be achieved.

According to a second aspect of the present invention, there is provided a receiver adapted to sequentially receive data packets from a communications network. Frames are encoded into the data packets, each frame comprising timestamp information T and payload size information L. The receiver may comprise a jitter data buffer and a processing unit adapted to determine a buffer level of the jitter data buffer on the basis of a first part of frame arrival delay related to payload size variation between frames and a second part related to the amount of cross-traffic in the communications network. The receiver may comprise a time measuring unit adapted to measure the arrival time of each frame. The receiver, or the processing unit, may be adapted to, for each frame, determine a frame payload size difference $\Delta L$ by comparing L of the current frame with L of a previous frame, determine a frame inter-arrival time $\Delta t$ by comparing the measured arrival time of the current frame with the measured arrival time of a previous frame, determine a temporal frame spacing $\Delta T$ by comparing T of the current frame with T of a previous frame, and/or determine a frame network transit delay d on the basis of the difference between $\Delta t$ and $\Delta T$. The receiver, or the processing unit, may be adapted to, for each frame, estimate a set of parameters of a linear relationship between $\Delta L$ and d on the basis of $\Delta L$ and d for the current frame and $\Delta L$ and d determined for at least one previous frame. A first parameter and a second parameter comprised in the set are indicative of the first and second part, respectively. The receiver, or the processing unit, may be adapted to, for each frame, estimate a maximum frame payload size and an average frame payload size on the basis of L of the current frame and L of at least one previous frame. For each frame, the buffer level may be determined on the basis of the maximum frame payload size, the average frame payload size and the parameters of the linear relationship.

By such a receiver, or decoder, there may be provided a receiver (or decoder) adapted to sequentially receive data packets from a communications network, which receiver (or decoder) may achieve the same or similar advantages achieved by the method according to the first aspect of the present invention.

According to a third aspect of the present invention, there is provided a computer program product adapted to, when executed in a processor unit, perform a method according to the first aspect of the present invention or any embodiment thereof.

According to a fourth aspect of the present invention, there is provided a computer-readable storage medium on which there is stored a computer program product adapted to, when executed in a processor unit, perform a method according to the first aspect of the present invention or any embodiment thereof.

Such a processing unit, or microprocessor, may for example be comprised in a receiver, or decoder, according to the second aspect of the present invention. Alternatively, or optionally, such processing unit or microprocessor may be arranged externally in relation to the receiver or decoder, with the processing unit or microprocessor being electrically connected to the receiver or decoder.

The first and second parameters may for example comprise a slope and a variance.

The estimation of the parameters of a linear relationship between $\Delta L$ and d may for example be performed by means of an adaptive filter algorithm, such as adaptive linear regression, recursive least-squares estimation, a Kalman filter, etc. Such adaptive filter algorithms may be used in different combinations. By utilizing one or more adaptive filter algorithms, the accuracy of the estimation of the linear relationship between $\Delta L$ and d may be refined by the choice of the adaptive filter algorithm(s) and/or the model parameters of the respective adaptive filter algorithm. For example, the adaptive filter algorithm(s) may be selected and/or the parameters thereof may be modified on the basis of user, capacity and/or application requirements.

There may be determined whether the absolute value of a difference between d for the current frame and at least one of the first part of frame arrival delay, related to payload size variation between frames, for respective previous frames exceeds a predetermined threshold value.

In other words, a so called "sanity" check, or extreme outlier identification, can be made on the measurements (e.g. frame payload sizes, arrival time differences) prior to performing an estimation of a set of parameters of a linear relationship between $\Delta L$ and d. In this manner, the effect of undesired, spurious events in the data packet delivery in the communication network may be avoided or mitigated.

An indication of a discontinuous change in a parameter of the communications network may be sensed. The parameter may be indicative of traffic conditions of the communications net-work.

In other words, so called change detection may be performed to assess whether a discontinuous, or abrupt, change has occurred in traffic conditions of the communications network. Such change detection may be performed in various manners, for example in accordance with user, capacity and/or application requirements. For example, change detection may be performed by means of a CUSUM test.

In case an indication of a discontinuous change in the parameter is sensed, at least one model parameter used in the estimation of the parameters of a linear relationship between $\Delta L$ and d may be reset. In this manner, re-convergence of the process of estimating a set of parameters of a linear relationship between $\Delta L$ and d for the new network conditions may be facilitated.

The at least one model parameter may for example comprise a Kalman covariance matrix, a noise estimate, etc., depending on implementation details.

There may be determined, on the basis of T of the current frame and T of the previous frame, whether the previous frame was transmitted earlier with regards to transmission order compared to the current frame, In other words, it may be checked whether the current frame has suffered from re-ordering. In this case, the processing of the current frame may be stopped and discarded. Subsequently, the receiver may await the arrival of the next frame for processing thereof.

Further objects and advantages of the present invention are described in the following by means of exemplifying embodiments.

BRIEF DESCRIPTION OF THE DRAWINGS

Exemplifying embodiments of the present invention will be described in the following with reference to the other accompanying drawings, in which.

In the accompanying drawings, the same reference numerals denote the same or similar elements throughout the views.

DETAILED DESCRIPTION

Figure 1:
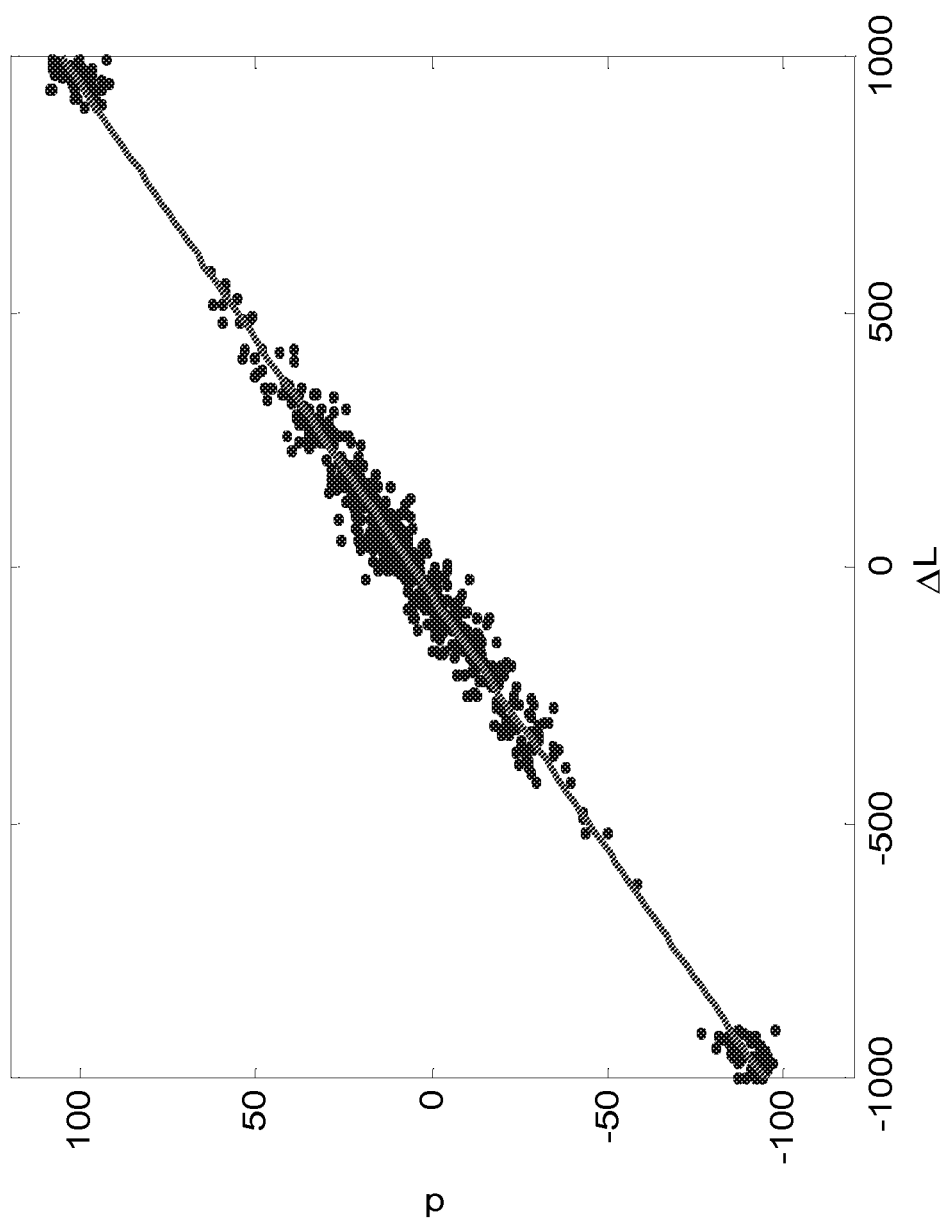
FIG. 1 is a schematic exemplifying graph of the frame network transit delay d versus the frame payload size difference $\Delta L$.

The present invention will now be described more fully hereinafter with reference to the accompanying drawings, in which exemplifying embodiments of the invention are shown. This invention may, however, be embodied in many different forms and should not be construed as limited to the embodiments set forth herein; rather, these embodiments are provided by way of example so that this disclosure will be thorough and complete, and fully convey the scope of the invention to those skilled in the art. Furthermore, like numbers refer to like or similar elements or components throughout. The steps of any method disclosed herein do not have to be performed in the exact order disclosed, unless explicitly stated.

According to the present invention, the transmission delay of a packet or cluster of packets may be considered to be made up of two independent parts: self-inflicted delay and cross-traffic delay. Because a large packet (i.e. having a large payload) generally takes a longer time to transmit over a network link with limited capacity compared to a smaller packet, the payload size variations from one image (or frame) to the next generally give rise to a payload-size dependent delay variation, which is referred to in the context of some embodiments of the present invention as self-inflicted delay. Any delays that arise because of other network traffic (cross-traffic) utilizing the links and queues of the network are referred to in the context of some embodiments of the present invention as the cross-traffic delay. To the receiver, the cross-traffic delay may appear as quasi-random and independent of the (video) traffic.

The present invention is based on separating the packet delay contributions into self-inflicted and cross-traffic delays, estimating appropriate parameters describing the current conditions for the self-inflicted delay and the cross-traffic delay, and determining an appropriate jitter buffer level based on the estimates.

In a video-over-IP system, the encoder may operate on clusters of packets that make up each image. In the context of some embodiments of the present invention, such a group of packets is referred to as a 'frame'. When the arrival of a frame is completed at the receiver, i.e. when all the packets included in the frame have arrived at the receiver, the arrival time may be determined. Comparing the arrival time with the arrival time of a previously received frame provides a frame inter-arrival time $\Delta t$.

In general, each frame comprises some kind of timing information, or time-stamp information, that indicates the production time of the frame. Such timing information may for example comprise the timestamp field in a real-time transport protocol (RTP) header. Such timing information may provide a nominal temporal frame spacing between the present frame and a previously received frame, denoted $\Delta T$. The nominal temporal frame spacing $\Delta T$ may for example comprise the time between capturing the two frames from a camera. By determining a difference between the actual inter-arrival time $\Delta t$ and the nominal temporal frame spacing $\Delta T$ a deviation measure, or a frame network transit delay, d for the currently received frame may be obtained. For example, $d=\Delta t-\Delta T$.

In general, each frame comprises payload size information L. The difference $\Delta L$ between the payload size between the currently received frame and a previously received frame may be determined.

The self-inflicted delay and the cross-traffic delay described in the foregoing may be described as a part of d that can be attributed to $\Delta L$ and a part that generally cannot be attributed to $\Delta L$. Namely, in case of a relatively large value of $\Delta L$, the current frame is larger than the previous frame, and the current frame may generally be expected to be later than the previous frame. This would result in an increased $\Delta t$, resulting in a larger value of d. On the other hand, the cross-traffic related delay generally affects $\Delta t$ in ways that are difficult to correlate with $\Delta L$.

On receiving the complete frame with frame number k, the frame delay $d(k)=\Delta t(k)-\Delta T(k)=t(k)-t(k-1)-(T(k)-T(k-1))$ may be calculated. The payload size difference is denoted $\Delta L(k)=L(k)-L(k-1)$. The differential frame delay, or frame network transit delay, may be assumed to follow the model $$d(k)=A+B\Delta L(k)+w(k),$$

where w(k) represents the cross-traffic related delay. It may be assumed that w(k), k=0, 1, 2, ... is a sequence of independent realizations of a zero-mean stochastic variable with variance $\sigma^2$. Hence, the relation between d(k) and $\Delta L$ may be represented by a straight line with offset A and slope B, with a scattering around the line determined by $\sigma^2$.

In view of the foregoing description and with reference to FIG. 1, in FIG. 1 there is shown a schematic exemplifying straight line and scatter plot of the frame network transit delay d versus the frame payload size difference $\Delta L$. The quantities d and $\Delta L$ may for example be given in units of ms and bytes, respectively.

Given estimates of the parameters A, B and $\sigma^2$, respectively, and knowledge of the largest expected $\Delta L$, the worst case frame inter-arrival time may be estimated. On the basis of this worst case frame inter-arrival time a size of the jitter buffer may be set that mitigates the jitter.

In view of the above, an embodiment of the present invention may comprise collecting measurements of d(k) and $\Delta L(k)$ for a number of frames k, estimating parameters A, B, and $\sigma^2$, storing or estimating the largest expected frame size difference $\Delta L$, and determining a jitter buffer level based on the estimates.

Figure 2A:
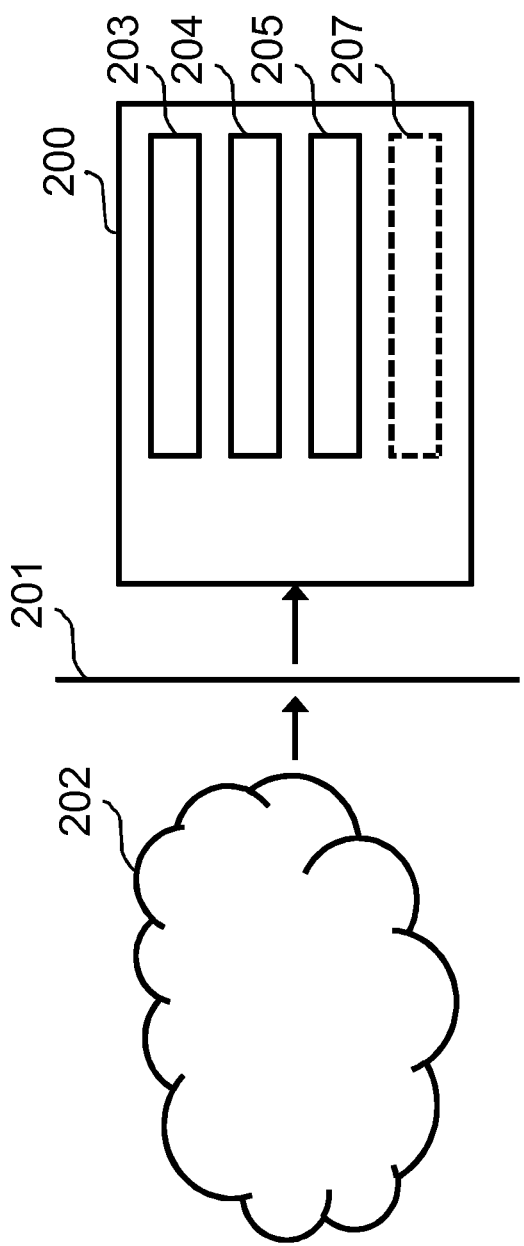
FIG. 2A is a schematic view of a receiver according to an exemplifying embodiment of the present invention.

Referring now to FIG. 2A, there is shown a schematic view of a receiver 200 according to an exemplifying embodiment of the present invention. The receiver 200 is communicating in a wireless manner with a communications network 202 via an air interface 201. The receiver comprises a data jitter buffer 203. The receiver may comprise a time-measuring unit 204 and a processing unit 205.

The communication between the receiver 200 and the communications network 202 may be performed in a non-wired (e.g. by means of wireless radiowave communications) or a wired (e.g. by means of electrical conductors or optical fibers or the like) fashion.

Figure 2B:
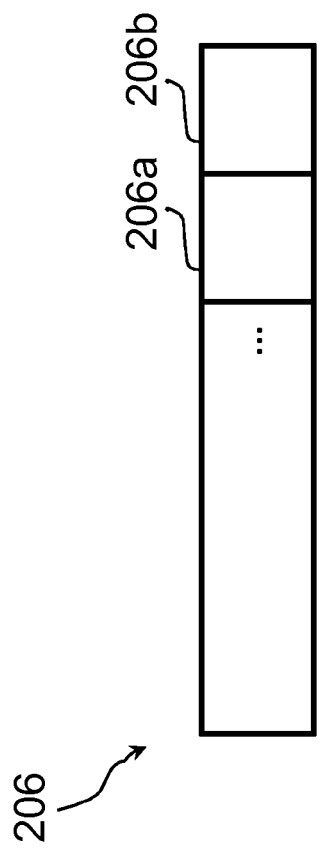
FIG. 2B is a schematic view of a frame in accordance with an exemplifying embodiment of the present invention.

Referring now to FIG. 2B, the receiver 200 may be adapted to sequentially receive data packets from the communications network 202, wherein frames 206 are encoded into the data packets, each frame 206 comprising timestamp information T 206a and payload size information L 206b. Each frame 206 may alternatively or optionally comprise additional information. According to an embodiment of the present invention, the buffer level of the data jitter buffer 203 is determined on the basis of a first part of frame arrival delay related to payload size variation between frames and a second part related to the amount of crosstraffic in the communications network 202.

Optionally, or alternatively, the receiver 200 may comprise a sensing unit 207, which may be adapted to sense an indication of a discontinuous change in a parameter of the communications network 202. This parameter may for example be indicative of traffic conditions in the communications network 202.

Figure 3:
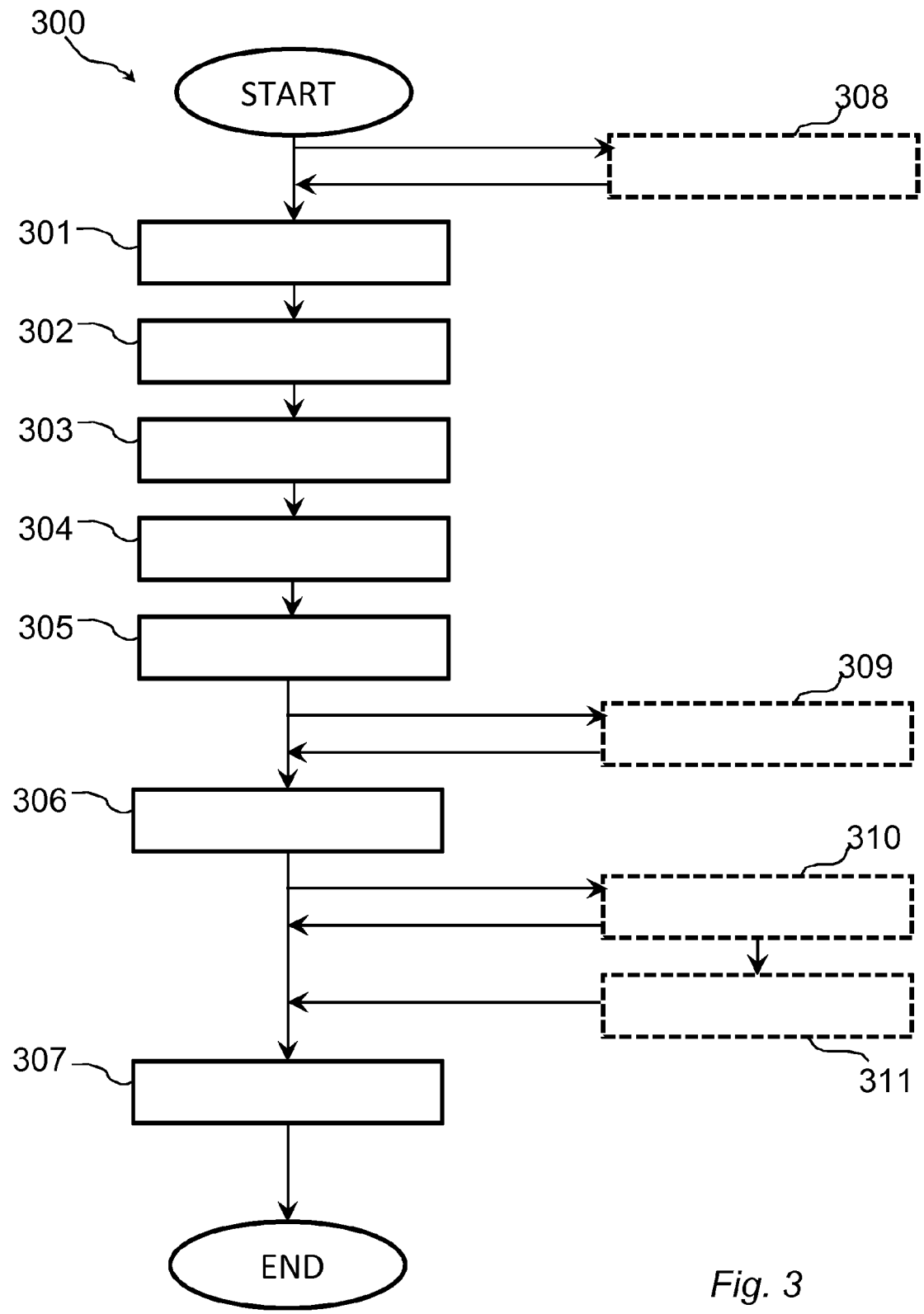
FIG. 3 is a schematic flow diagram of a method according to an exemplifying embodiment of the present invention.

Referring now to FIG. 3, there is shown a schematic flow diagram of a method 300 according to an exemplifying embodiment of the present invention. With reference to FIGS. 2A and 2B, a receiver 200 may be adapted to sequentially receive data packets from a communications network 202. The data packets may be such that frames 206 are encoded in the data packets.

Referring now again to FIG. 3, at step 301 a frame payload size difference $\Delta L$ may be determined for each frame by comparing L of the current frame with L of a previous frame.

At step 302, a frame inter-arrival time $\Delta t$ may be determined by comparing the measured arrival time of the current frame with the measured arrival time of a previous frame.

At step 303, a temporal frame spacing $\Delta T$ may be determined by comparing T of the current frame with T of a previous frame.

At step 304, a frame network transit delay d may be determined on the basis of the difference between $\Delta t$ and $\Delta T$.

The method 300 may further comprise, for each frame, in step 305 estimating a set of parameters of a linear relationship between $\Delta L$ and d on the basis of $\Delta L$ and d for the current frame and $\Delta L$ and d determined for at least one previous frame. With reference to FIGS. 2A and 2B, a first parameter and a second parameter comprised in the set may be adapted to be indicative of a first part of frame arrival delay related to payload size variation between frames 206 and a second part related to the amount of crosstraffic in the communications network 202.

The method 300 may further comprise, for each frame, in step 306 estimating a maximum frame payload size and an average frame payload size on the basis of L of the current frame and L of at least one previous frame.

The method 300 may further comprise, for each frame, a step 307 of determining the buffer level on the basis of the maximum frame payload size, the average frame payload size and the parameters of the linear relationship.

Optionally, the method 300 may comprise a step 308 comprising determining, on the basis of T of the current frame and T of the previous frame, whether the previous frame was transmitted earlier with regards to transmission order compared to the current frame.

Optionally, the method 300 may comprise a step 309 comprising determining whether the absolute value of a difference between d for the current frame and at least one of the first part of frame arrival delay, related to payload size variation between frames, for respective previous frames exceeds a predetermined threshold value.

Optionally, the method 300 may comprise a step 310 comprising sensing an indication of a discontinuous change in a parameter of the communications network. The parameter may for example be indicative of traffic conditions in the communications network. Optionally, if an indication of a discontinuous change in such a parameter has been sensed, at least one model parameter used in the estimation of the parameters of a linear relationship between $\Delta L$ and d may be reset (step 311).

In the following, a method according to an exemplifying embodiment of the present invention is described in some detail.

The method of the exemplifying embodiment can be described using three phases—inter-arrival delay calculation, parameter estimation and buffer level calculation—each phase being carried out at least once each time arrival of a frame is completed, i.e. when all the packets included in the frame have arrived at the receiver. Additionally, there may be a reset phase, carried out in the beginning of the method and also when otherwise found necessary. The phases are described in the following.

The following notation is used in the description in the following:

F: The last received frame that is currently being processed.
$F_p$: A previously processed frame.
t: Arrival time for frame F (the time at which the arrival of the frame is completed at the receiver).
$t_p$: Arrival time for frame $F_p$.
T: Timestamp for frame F.
$T_p$: Timestamp for frame $F_p$.
L: Payload size (in the communications network) for frame F.
$L_p$: Payload size (in the communications network) for frame $F_p$.
$L_{avg}(k)$: The k-th update of the estimated average payload size.
$\phi$: Filter factor for estimate $L_{avg}$; $0 \leq \phi \leq 1$.
$L_{max}(k)$: The k-th update of the estimated maximum payload size.
$\psi$: Filter factor for estimate $L_{max}$; $0 \leq \phi \leq 1$.
$C_1$: Design parameter; $C_1 > 0$.
$C_2$: Design parameter; $C_2 > 0$.
$\sigma^2(k)$: The k-th update of the estimated noise variance.
m(k): The k-th update of the estimated noise mean.
D(k): The k-th update of the desired buffer level.
A(k): The k-th update of the line offset.
B(k): The k-th update of the line slope.
M(k|k−1) and M(k|k): Predictor and measurement updates, respectively, of the Kalman filter covariance matrix.
K(k): Kalman filter gain vector in the k-th iteration.
Q: Kalman filter process noise covariance matrix.
I: 2-by-2 identity matrix.

Reset Phase I

At time index k=0, all parameters and variables may be reset to suitable initial values. What constitutes a suitable initialization may vary depending on current communications network conditions and application.

Inter-arrival Delay Calculation

In case the current frame has suffered from re-ordering (in other words, if the current frame is earlier in (transmission-order) sequence than the last processed frame), the processing for the current frame may be stopped and the current frame may be discarded.

In other case, a nominal inter-arrival time is calculated using the timestamps of the current frame and a previously received frame:

$$\Delta T = T - T_p.$$

The actual inter-arrival time is calculated:

$$\Delta t = t - t_p.$$

The frame network transit delay is calculated:

$$d = \Delta t - \Delta T.$$

All of these times and time periods may be adjusted in order to use the same time scale, e.g., milliseconds or sample periods.

Parameter Estimation

Another phase in the exemplifying method is to estimate the model parameters.

A frame size difference is calculated:

$$\Delta L = L - L_p.$$

The average estimate for frame size is calculated:

$$L_{avg}(k)=\phi L_{avg}(k-1)+(1-\phi)L.$$

The estimate of the maximum frame size is calculated:

$$L_{max}(k)=\max\{(\psi L_{max}(k-1);L\}.$$

An extreme outlier identification may then be performed. Let $$\delta=d-(A(k-1)+B(k-1)\Delta L).$$

In case $|\delta| \geq C_1 \sqrt{\sigma^2(k-1)}$, the current frame may be considered to be an extreme outlier.

Next, one hand, if the current frame is not an extreme outlier:

Update average noise: $m(k)=\alpha m(k-1)+(1-\alpha)\delta$.
Update noise variance: $\sigma^2(k)=\alpha\sigma^2(k-1)+(1-\alpha)(\delta-m(k))^2$.
Update the estimates of A and B using, e.g., a Kalman filter iteration:

Covariance matrix predictor update:

$$M(k|k-1)=M(k-1|k-1)+Q.$$

Compute Kalman gain vector:

$$K(k) = \frac{M(k|k-1)\begin{bmatrix}\Delta L \\ 1\end{bmatrix}}{f+[\Delta L\ 1]M(k|k-1)\begin{bmatrix}\Delta L \\ 1\end{bmatrix}}$$

where the function $f$ may be:

$$f = \left(300 e^{-\frac{|\Delta L|}{L_{max}(k)}} + 1\right)\sqrt{\sigma^2(k)}.$$

Update estimates of A and B:

$$\begin{bmatrix}B(k)\\A(k)\end{bmatrix} = \begin{bmatrix}B(k-1)\\A(k-1)\end{bmatrix} + K(k)(d-A(k-1)+B(k-1)\Delta L).$$

Calculate covariance matrix measurements:

$$M(k|k)=(I-K(k)[\Delta L 1])M(k|k-1).$$

On the other hand, if the current frame is an extreme outlier:

Let $s_\delta$ be the sign function of $\delta$, i.e., $$s_\delta = \begin{cases} -1, & \delta < 0;\\ +1, & \delta \geq 0.\end{cases}$$

Calculate average noise: $m(k)=\Delta m(k-1)+(1-\alpha)s_\delta C_1 \sqrt{\sigma^2(k-1)}$.

Calculate noise variance: $\sigma^2(k)=\alpha\sigma^2(k-1)+(1-\alpha)(s_\delta C_1 \sqrt{\sigma^2(k-1)}-m(k))^2$.

Reset Phase II

Next, change detection may be performed in order to assess whether an abrupt change has occurred in the network. Change detection can be performed in many manners, for example by utilizing a CUSUM test. In case an abrupt change is detected, a suitable set of variables may be reset. For instance, the Kalman covariance matrix M(k|k) can be reset to its initial (large) value in order to facilitate a rapid re-convergence to the new communication network conditions. Alternatively or optionally, the noise estimates $\sigma^2(k)$ and/or m(k) can be reset.

Buffer Level Calculation

The last phase in the exemplifying method comprises calculation of the desired buffer level:

$$D(k)=B(k)(L_{max}-L_{avg})+C_2\sqrt{\sigma^2(k)}.$$

Figure 4:
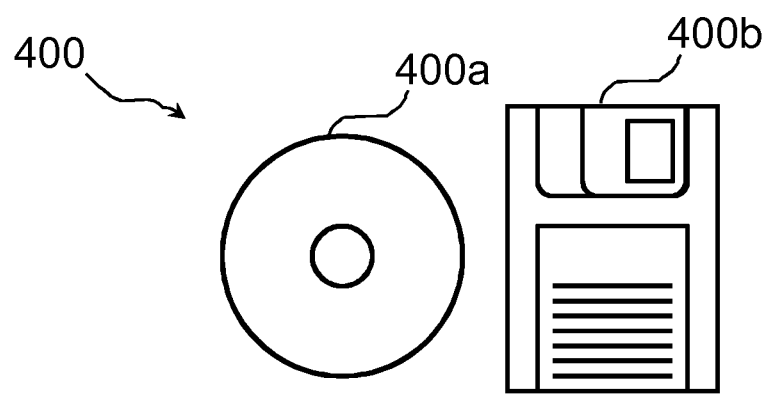
FIG. 4 are schematic views of different exemplifying types of computer readable digital storage mediums according to embodiments of the present invention.

Referring now to FIG. 4, there are shown schematic views of computer readable digital storage mediums 400 according to exemplifying embodiments of the present invention, comprising a DVD 400*a* and a floppy disk 400*b*. On each of the DVD 400*a* and the floppy disk 400*b* there may be stored a computer program comprising computer code adapted to perform, when executed in a processor unit, a method according to the present invention or embodiments thereof, as has been described in the foregoing.

Although only two different types of computer-readable digital storage mediums have been described above with reference to FIG. 4, the present invention encompasses embodiments employing any other suitable type of computer-readable digital storage medium, such as, but not limited to, a non-volatile memory, a hard disk drive, a CD, a flash memory, magnetic tape, a USB stick, a Zip drive, etc.

The receiver may comprise one or more microprocessors (not shown) or some other device with computing capabilities, e.g. an application specific integrated circuit (ASIC), a field programmable gate array (FPGA), a complex programmable logic device (CPLD), etc., in order to perform operations such as estimating a set of parameters of a linear relationship between $\Delta L$ and d. Such a microprocessor may alternatively or optionally be comprised in, integrated with, or be, the processing unit of the receiver.

When performing steps of different embodiments of the method of the present invention, the microprocessor typically executes appropriate software that is downloaded to the receiver and stored in a suitable storage area, such as, e.g., a Random Access Memory (RAM), a flash memory or a hard disk, or software that has been stored in a non-volatile memory, e.g., a Read Only Memory (ROM). Such a microprocessor or processing unit may alternatively or optionally be located externally relatively to the receiver (and electrically connected to the receiver).

A computer program product comprising computer code adapted to perform, when executed in a processor unit, a method according to the present invention or any embodiment thereof may be stored on a computer (e.g. a server) adapted to be in communication with a receiver according to an exemplifying embodiment of the present invention. In this manner, when loaded into and executed in a processor unit of the computer, the computer program may perform the method. Such a configuration eliminates the need to store the computer program locally at the receiver. The communication between the computer and the receiver may be implemented in a wired fashion (e.g. by means of Ethernet) or in a non-wired fashion (e.g. by means of wireless infra-red (IR) communications or other wireless optical communications, or by means of wireless radiowave communications.

While the invention has been illustrated and described in detail in the appended drawings and the foregoing description, such illustration and description are to be considered illustrative or exemplifying and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

The invention claimed is:

1. A method for determining a buffer level of a jitter data buffer comprised in a receiver adapted to sequentially receive data packets from a communications network, wherein frames are encoded into the data packets, each frame comprising timestamp information, T, and payload size information, L, wherein the buffer level is determined on the basis of a first part of frame arrival delay related to payload size variation between frames and a second part related to the amount of crosstraffic in the communications network, the method comprising, for each frame:
    determining a frame payload size difference, $\Delta L$, by comparing L of the current frame with L of a previous frame;
    determining a frame inter-arrival time, $\Delta t$, by comparing the measured arrival time of the current frame with the measured arrival time of a previous frame;
    determining a temporal frame spacing, $\Delta T$, by comparing T of the current frame with T of a previous frame;
    determining a frame network transit delay, d, on the basis of the difference between $\Delta t$ and $\Delta T$;
    estimating a set of parameters of a linear relationship between $\Delta L$ and d on the basis of $\Delta L$ and d for the current frame and $\Delta L$ and d determined for at least one previous frame, wherein a first parameter and a second parameter comprised in the set are indicative of the first and second part, respectively;
    estimating a maximum frame payload size and an average frame payload size on the basis of L of the current frame and L of at least one previous frame; and
    determining the buffer level on the basis of the maximum frame payload size, the average frame payload size and the parameters of the linear relationship.

2. The method according to claim 1, wherein the first and second parameters comprise a slope and a variance.

3. The method according to claim 1, wherein the estimation of the parameters of a linear relationship between $\Delta L$ and d is performed by means of an adaptive filter algorithm.

4. The method according to claim 1, further comprising:
    determining whether the absolute value of a difference between d for the current frame and at least one of the first part of frame arrival delay, related to payload size variation between frames, for respective previous frames exceeds a predetermined threshold value.

5. The method according to claim 1, further comprising:
    sensing an indication of a discontinuous change in a parameter of the communications network, the parameter being indicative of traffic conditions in the communications network.

6. The method according to claim 5, further comprising:
    if an indication of a discontinuous change in the parameter has been sensed, resetting at least one model parameter used in the estimation of the parameters of a linear relationship between $\Delta L$ and d.

7. The method according to claim 1, further comprising:
    determining, on the basis of T of the current frame and T of the previous frame, whether the previous frame was transmitted earlier with regards to transmission order compared to the current frame.

8. A computer program product adapted to, when executed in a processor unit, perform a method according to claim 1.

9. A computer-readable storage medium on which there is stored a computer program product adapted to, when executed in a processor unit, perform a method according to claim 1.

10. A receiver adapted to sequentially receive data packets from a communications network, wherein frames are encoded into the data packets, each frame comprising timestamp information, T, and payload size information, L, the receiver comprising:
    a jitter data buffer;
    a time measuring unit; and
    a processing unit adapted to determine a buffer level of the jitter data buffer on the basis of a first part of frame arrival delay related to payload size variation between frames and a second part related to the amount of crosstraffic in the communications network;
    wherein the time measuring unit is adapted to measure the arrival time of each frame; and
    wherein the processing unit is adapted to, for each frame:
    determine a frame payload size difference, $\Delta L$, by comparing L of the current frame with L of a previous frame;
    determine a frame inter-arrival time, $\Delta t$, by comparing the measured arrival time of the current frame with the measured arrival time of a previous frame;
    determine a temporal frame spacing, $\Delta T$, by comparing T of the current frame with T of a previous frame;
    determine a frame network transit delay, d, on the basis of the difference between $\Delta t$ and $\Delta T$;
    estimate a set of parameters of a linear relationship between $\Delta L$ and d on the basis of $\Delta L$ and d for the current frame and $\Delta L$ and d determined for at least one previous frame, wherein a first parameter and a second parameter comprised in the set are indicative of the first and second part, respectively;
    estimate a maximum frame payload size and an average frame payload size on the basis of L of the current frame and L of at least one previous frame; and
    determine the buffer level on the basis of the maximum frame payload size, the average frame payload size and the parameters of the linear relationship.

11. The receiver according to claim 10, wherein the first and second parameters comprise a slope and a variance.

12. The receiver according to claim 10, wherein the processing unit is adapted to estimate the set of parameters of a linear relationship between $\Delta L$ and d by means of an adaptive filter algorithm.

13. The receiver according to claim 10, wherein the processing unit is further adapted to determine whether the absolute value of a difference between d for the current frame and at least one of the first part of frame arrival delay, related to payload size variation between frames, for respective previous frames exceeds a predetermined threshold value.

14. The receiver according to claim 10, further comprising a sensing unit adapted to sense an indication of a discontinuous change in a parameter of the communications network, the parameter being indicative of traffic conditions of the communications network.

15. The receiver according to claim 10, wherein the processing unit is further adapted to determine, on the basis of T of the current frame and T of the previous frame, whether the previous frame was transmitted earlier with regards to transmission order compared to the current frame.

* * * * *